Jan. 13, 1970   R. C. MONTROSS   3,489,974
CURRENT SENSING PULSE OUTPUT TRANSFORMER
Filed May 27, 1968
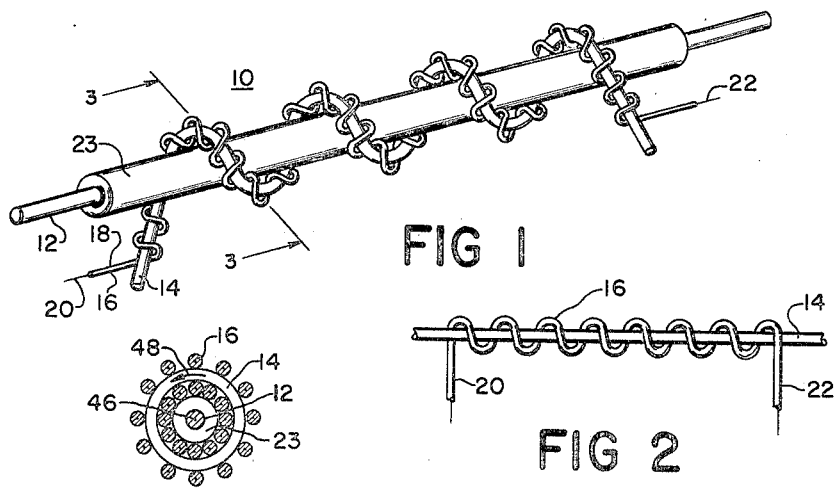
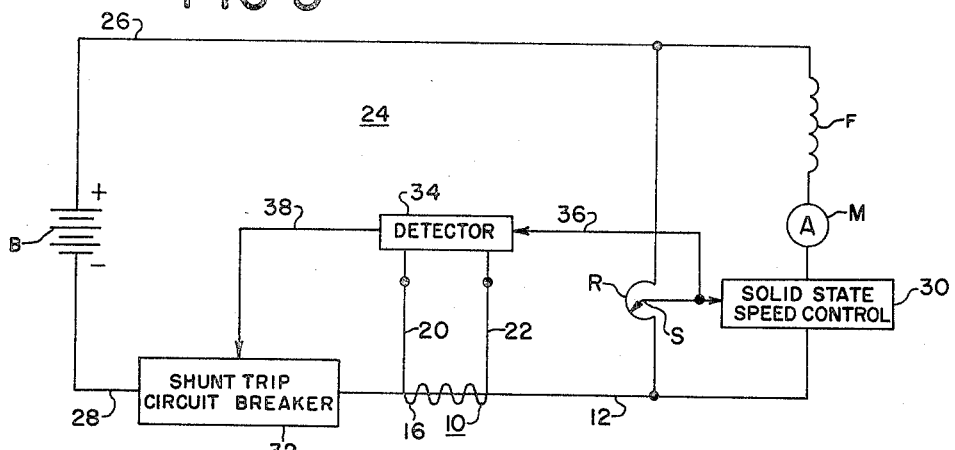
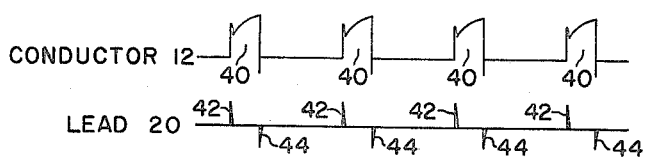
INVENTOR.
ROBERT C. MONTROSS
BY William H. Schmeling

United States Patent Office 3,489,974
Patented Jan. 13, 1970

3,489,974
CURRENT SENSING PULSE OUTPUT TRANSFORMER
Robert C. Montross, Mequon, Wis., assignor to Square D Company, Park Ridge, Ill., a corporation of Michigan
Filed May 27, 1968, Ser. No. 732,296
Int. Cl. H01f 40/00, 17/06, 27/28
U.S. Cl. 336—174                    3 Claims

ABSTRACT OF THE DISCLOSURE

A current sensing transformer that will provide a pulse output in response to a reversal in current flow in a conductor and wherein the transformer includes a magnet iron wire core that is helically wound and surrounds the conductor, and a secondary winding that includes an insulated conductor that is helically wound about the helically wound core.

---

This invention relates to transformers and more particularly, to pulse output type transformers as may be used in a control circuit.

A transformer is an electrical device, without moving parts, that transfers electrical energy by electromagnetic induction from one or more circuits to one or more other circuits and is found useful in a large variety of electrical circuits. Conventionally, a transformer includes an input conductor called a primary winding, an output conductor called a secondary winding which is inductively coupled to the primary winding through magnet iron or air cores. As transformers are used in a large variety of circuits for varying purposes, their constuctional details will vary greatly. The present invention is concerned with an economical transformer construction and method of making the same which will provide an output proportional to the rate of change of current and is particularly useful in a control circuit to sense current changes in the circuit.

It is an object of the present invention to provide an inexpensive transformer structure which will rapidly respond to a rate of change in current in a circuit and provide a relatively high output voltage pulse in relation to the amount of iron and copper used in the transformer.

Another object is to provide a current sensing transformer which will provide opposite polarity output voltage pulses in response to a sudden increase and decrease in current in a circuit.

An additional objetct is to provide a transformer with a helically wound magnet iron core that surrounds a length of a conductor which acts as a primary winding for the transformer and a secondary winding that is helically wound about the helically wound core.

A further object is to form an inexpensive transformer by winding an insulated winding helically about a length of magnet iron wire and then to wind the wound iron wire into a helix so a length of wire passing through the helix may act as a primary winding and the helically wound wire on the iron wire may act as a secondary winding for the transformer.

Further objects and features of the invention will be readily apparent to those skilled in the art from the specification and appended drawing illustrating certain preferred embodiments, in which:

FIG. 1 is a perspective view and partly diagrammatic showing of a transformer construction according to the present invention.

FIG. 2 is a diagrammatic view illustrating a method of winding a secondary winding on a magnet iron wire core as used in FIG. 1.

FIG. 3 is a cross sectional view taken generally along lines 3–3 in FIG. 1 with certain windings of the transformer more closely spaced than in FIG. 1.

FIG. 4 diagrammatically shows a typical circuit wherein the transformer shown in FIG. 1 may be used.

FIG. 5 graphically illustrates the pulses of input current and the pulse output of the transformer as used in the circuit in FIG. 4.

A transformer 10, as shown in FIG. 1, includes a conductor 12, which acts as a primary winding, a solid magnet iron wire 14, which acts as a core, and a wire 16, which acts as a secondary winding for the transformer 10. The transformer 10 is basically a current sensing device and its structure is most readily explained in terms of one method that may be used in its manufacture. Initially, the wire 16, which preferably is a thin wire having an insulating cover 18, is wound as a single layer helically about a straight length of the wire core 14, as shown in FIG. 2, to provide a pair of leads 20 and 22 at the opposite ends of the wire core 14 as may be provided by removing portions of the insulating covering 18 at the ends of the wire 16. The wire core 14, which also may be of relatively thin material, with the helically wound wire 16 thereon, is then helically wound either about a separate mandrel or directly on the conductor 12. When the helically wound core wire 14 with the wire 16 wound thereon is wound on a mandrel, the conductor 12 which has an insulating covering 23 thereon is inserted through the convolutions of the helical core wire 14. In FIGS. 1 and 2 of the drawings the spacing between adjacent turns of the helically wound wires 14 and 16 has been exaggerated for purposes of illustration. In actual practice the turns of the wires 14 and 16 are closely spaced to provide an efficient transformer structure.

A simplified form of a control circuit 24 that may include the transformer 10 is shown in FIG. 4. The circuit shown is fully disclosed in an application for United States Patent Ser. No. 732,295, filed May 27, 1968 which has been assigned by the inventors Robert C. Montross and Armand G. Mueller to the assignee of the present invention. As disclosed, the circuit 24 is particularly suited for use in a battery powered vehicle, such as an industrial truck which is powered by a traction motor M that has an armature A and a series field winding F supplied with current from a battery B. The battery B has a positive terminal connected to a lead 26 and a negative terminal connected to a lead 28. Connected in a series circuit between the leads 26 and 28 is the field winding F and the armature winding A of the motor M, solid state speed control circuitry designated by a numeral 30, the conductor 12 and a shunt trip circuit breaker 32. Connected between the leads 26 and 12 so as to be responsive to the potential of the battery B is an adjustable resistor R having a slider S. The slider S is connected to supply an input signal to the speed control circuitry 30 to vary the speed of the motor M. The transformer 10, which is constructed as shown in FIG. 1, is included in the circuit to be responsive to current flow in the lead 12. The transformer 10 supplies output signals through the leads 20 and 22 to a detector circuit 34 which receives an input from the slider S through a lead 36 and supplies an output to the circuit breaker 32 through a lead 38.

The circuit 24 shown in FIG. 4 functions as follows. When the motor M is to be energized, the speed control 30 causes the motor M to be supplied with pulses of direct current indicated by the numeral 40 in FIG. 5. The speed control 30 circuitry is arranged so that the direct current pulses 40 each have a constant time duration and the interval between the pulses 40 is variable as determined by the adjustment of the slider S. When the slider S is positioned at the lead 26 end of the resistor R, the pulses 40 will occur at a maximum frequency for maximum speed and torque operation of the motor M. When the slider S is positioned adjacent the lead 12 end of the resistor R, the pulses 40 will occur at a minimum frequency for a minimum motor M speed and torque operation. Each of the current pulses 40 is delivered through the lead 12 which has a portion extending through the helical wound core wire 14 whereon the wire 16 is helically wound. The wire 16 in response to the pulses 40 of current in the lead 12 supplies output signals as shown by the curve designated as lead 20 in FIG. 5. That is, the pulses 40 of direct current through the circuit to the motor M energize the lead 12 which acts as a primary winding and causes the wire 16 to deliver a sharp positive voltage pulse 42 at the beginning of each pulse 40 until the wire core 14 saturates and a sharp negative pulse 44 at the end of each pulse 40 as the wire core 14 desaturates. During normal operating conditions of the speed control 30, each of the pulses 40 will be constant in duration and occur with a frequency dependent upon the adjustment of the slider S. However, under conditions of a failure or a malfunction of certain of the circuit components within the speed control 30, the duration of the pulses 40 or the frequency of the pulses 40 may exceed the normal value. Under these conditions the time interval between the pulses 42 and 44 or the frequency at which the pulses 42 and 44 occur will exceed a predetermined value and the detector 34 in response thereto will supply a signal to the shunt trip circuit breaker 32 through the lead 38. The shunt trip circuit breaker 32 in response to a signal from the lead 36 will respond by opening contacts, not shown, to interrupt the circuit to the motor M and the detector 34 to prevent damage or injuries as may be caused when the motor M is energized under conditions of a malfunction or failure of the speed control 30 to function properly.

A possible explanation of the theory of operation of the transformer 10 will now be described. According to Lenz's Law: "In all cases of electromagnetic induction, the induced voltages have a direction such that the currents which they produce oppose the effect which produces them," and it is generally accepted that if a current flows in a conductor, a magnetic flux is set up about the conductor. This magnetic flux completely encircles the conductor and the current in the conductor completely encircles the flux.

Thus in FIG. 3, if it is assumed that the conductor 12 is conducting pulses of current as illustrated by the pulses 40 in FIG. 5, and the direction of current flow is outwardly of the figure as depicted by the point of the arrow 46, then a flux will be induced in the core wire 14 having a direction indicated by the arrow 48 and the core wire 14 will rapidly saturate because of its relatively thin cross section. However, the secondary wire 16, which is helically wound on the core wire 14 effectively presents a plurality of conductor loops surrounding the core wire 14 to provide a maximum mutual coupling between the secondary and primary windings as all the turns of the secondary winding are at the same distance from the center of the core that induces a voltage in the secondary winding. Thus the current increase of each pulse in the conductor 12 will be accompanied by the changing increasing flux in one direction in the core wire 14 as the core saturates and the decrease in current in each pulse through the conductor 12 will be accompanied by the changing decreasing flux in the core wire 14 in the opposite direction as the core wire 14 desaturates. The loops of the wire 16 effectively surround the core wire 14. Thus during the period of increasing flux and prior to saturation of the core wire 14, a current flow having one direction will be induced in the loops of the secondary wire 16 which will tend to oppose the saturation of the core wire 41 when the current of pulses 40 is increasing and the current flow in the opposite direction will be induced in the loops of the secondary wire 16 when the flux in the core wire 14 is changing in a direction to desaturate the core as the current flow of the pulses 40 decreases. Thus the current pulses 40 will cause the secondary wire 16 to provide the spaced opposite polarity output voltage pulses 42 and 44 shown in FIG. 5.

One form of a transformer 10 that has been satisfactorily tested included a secondary winding having 450 turns of No. 30 enameled covered copper wire which was closely wound as a helix about a 0.078 inch diameter iron wire after the iron wire had been covered with a single layer of glass tape. The wound core thus formed was then helically wound on a $5/16$ inch diameter mandrel; and an insulated covered Size No. 4 conductor, which provided the primary winding, was passed through the convolutions of the wound core after the wound core was removed from the mandrel. The transformer thus formed was tested by passing 12 ampere pulses of direct current having a rate of change ($di/dt$) of 9.6 amps./millisec. through the primary winding. The secondary winding in response to the current change in the primary winding provided output voltage pulses of 22 volts D.C. having a duration of 0.4 m.s. across a circuit which would be considered an open circuit because of the high resistance used therein.

Thus the transformer as described is particularly suited for use in control circuits having solid state components as it is extremely sensitive to rates of changes in a circuit and may be used in alternating current or pulsing direct current circuits and will provide relatively high output voltage pulses of short duration in relation to the amount of copper and iron used therein. Further, the transformer will present a very small inductance to its primary winding circuit because of the small amount of iron in the core and the small diameter of the turns of the secondary winding.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A current sensing transformer comprising a substantially straight primary winding, a helical magnet wire core surrounding a portion of the primary winding and a helical secondary winding surrounding a portion of the helical core.

2. The current sensing transformer as recited in claim 1 wherein the primary winding is a straight length portion of an insulating conductor.

3. The transformer structure as recited in claim 2 wherein the secondary winding is an insulated wound wire.

References Cited

UNITED STATES PATENTS

| 1,972,319 | 9/1934 | Rypinski | 336—173 |
| 2,921,255 | 1/1960 | Norton | 336—173 XR |
| 3,378,761 | 4/1968 | Morgan | 336—174 XR |

THOMAS J. KOZMA, Primary Examiner

U.S. Cl. X.R.

336—175, 225